United States Patent
Lee et al.

(10) Patent No.: US 9,516,228 B2
(45) Date of Patent: ***Dec. 6, 2016

(54) PHOTOGRAPHING APPARATUS, MOTION ESTIMATING APPARATUS, IMAGE COMPENSATING METHOD, MOTION ESTIMATING METHOD, AND COMPUTER-READABLE RECORDING MEDIUM

(71) Applicant: SAMSUNG ELECTRONICS CO., LTD., Gyeonggi-do (KR)

(72) Inventors: Yun-gu Lee, Seongnam-si (KR); Hong-jun Choi, Suwon-si (KR); Chang-woo Lee, Suwon-si (KR); Jae-Ho Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,338

(22) Filed: Aug. 19, 2015

(65) Prior Publication Data

US 2016/0014337 A1 Jan. 14, 2016

Related U.S. Application Data

(63) Continuation of application No. 13/618,153, filed on Sep. 14, 2012, now Pat. No. 9,143,686.

(30) Foreign Application Priority Data

Oct. 7, 2011 (KR) ........................ 10-2011-0102151

(51) Int. Cl.
*H04N 5/232* (2006.01)
*H04N 5/353* (2011.01)

(52) U.S. Cl.
CPC ........ *H04N 5/23254* (2013.01); *H04N 5/2329* (2013.01); *H04N 5/23248* (2013.01); *H04N 5/23267* (2013.01); *H04N 5/3532* (2013.01)

(58) Field of Classification Search
CPC ............ H04N 5/23254; H04N 5/23267; H04N 5/2329
See application file for complete search history.

(56) References Cited

U.S. PATENT DOCUMENTS

| | | |
|---|---|---|
| 5,343,204 A | 8/1994 | Farmer et al. |
| 6,067,420 A | 5/2000 | Hara et al. |
| 7,660,467 B2 | 2/2010 | Takemoto et al. |
| 8,395,671 B2 | 3/2013 | Kimura |
| 8,462,219 B2 | 6/2013 | Matsuyama |
| 8,723,969 B2 | 5/2014 | Garg et al. |
| 9,143,686 B2 * | 9/2015 | Lee ................. H04N 5/23254 |
| 2006/0140602 A1 | 6/2006 | Kurata et al. |
| 2007/0064809 A1 | 3/2007 | Watanabe et al. |

(Continued)

*Primary Examiner* — James Hannett
(74) *Attorney, Agent, or Firm* — Sughrue Mion, PLLC

(57) ABSTRACT

A photographing apparatus, a motion estimating apparatus, an image compensating method, a motion estimating method, and a non-transitory computer-readable recording medium are provided. The photographing apparatus includes: an image sensing unit which continuously captures a plurality of images by using a rolling shutter method; and an image processor which compensates for a uniformly accelerated motion of the photographing apparatus by using the plurality of images.

23 Claims, 11 Drawing Sheets

(56) References Cited

U.S. PATENT DOCUMENTS

2008/0172201 A1    7/2008   Kotake et al.
2010/0157080 A1    6/2010   Kondo
2012/0268555 A1   10/2012   Yamashita et al.
2012/0314093 A1   12/2012   Tamayama et al.

* cited by examiner

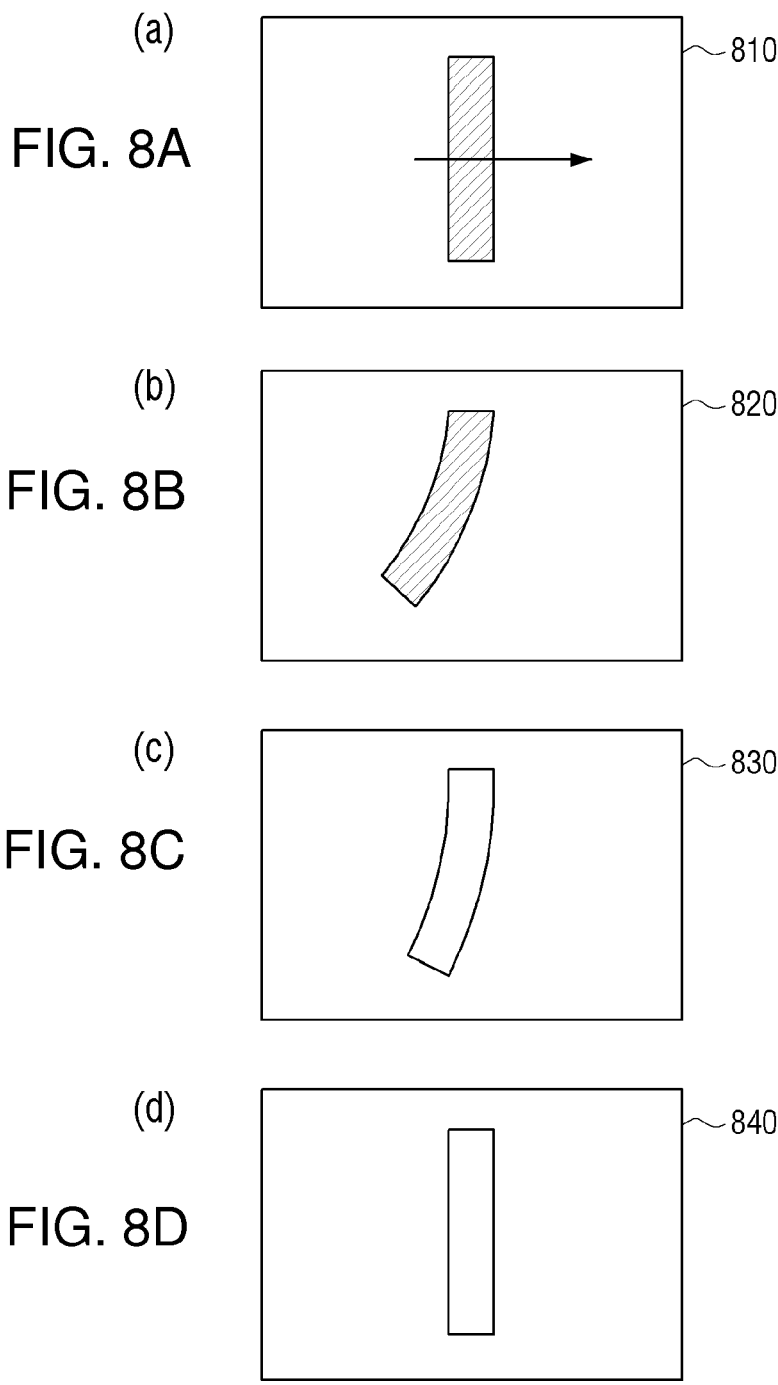

PHOTOGRAPHING APPARATUS, MOTION ESTIMATING APPARATUS, IMAGE COMPENSATING METHOD, MOTION ESTIMATING METHOD, AND COMPUTER-READABLE RECORDING MEDIUM

CROSS-REFERENCE TO RELATED APPLICATION

This is a continuation of application Ser. No. 13/618,153 filed Sep. 14, 2012, which claims priority under 35 U.S.C. §119 from Korean Patent Application No. 10-2011-0102151, filed on Oct. 7, 2011, in the Korean Intellectual Property Office, the disclosure of which is incorporated herein by reference in its entirety.

BACKGROUND

1. Field

Apparatuses consistent with exemplary embodiments relate to a photographing apparatus, a motion estimating apparatus, an image compensating method, a motion estimating method, and a computer-readable recording medium, and more particularly, to a photographing apparatus which can check a uniformly accelerated motion thereof through continuously captured images, a motion estimating apparatus, an image compensating method, a motion estimating method, and a computer-readable recording medium.

2. Description of the Related Art

An imaging device refers to a part which generates an image in a mobile phone camera or a digital still camera (DSC). Examples of the imaging device include a charge-coupled device (CCD) image sensor and a complementary metal oxide semiconductor (CMOS) image sensor.

The CCD image sensor refers to a device in which metal-oxide-silicon (MOS) capacitors are very close to one another, and charge carriers are stored in and transferred to the MOS capacitors. The CMOS image sensor refers to a device which adopts a switching method of forming and using MOS transistors by the number of pixels by using CMOS technology for using a control circuit and a signal processing circuit as peripheral circuits in order to sequentially detect outputs.

The CCD image sensor attracts the widest attention as a conventional image sensor and is currently widely used in a digital camera, a camera phone, or the like. However, as the importance of the camera phone stands out, it is important to reduce power consumption of the camera phone. Therefore, interest in the CMOS image sensor has increased. The CMOS image sensor is manufactured in a CMOS process for producing general silicon semiconductors, and thus, is small and cheap, and power consumption thereof is low.

A method of reading an optical image of a subject formed in an imaging area of an imaging device is classified as a global shutter method and a rolling shutter method. The global shutter method refers to a method by which all pixels of the imaging area read the optical image at a same time. The rolling shutter method refers to a method by which one or several pixels of the imaging area sequentially read the optical image.

The CMOS image sensor may apply both to the global shutter method and to the rolling shutter method. If the CMOS image sensor applies the global shutter method, all pixels read the optical image of the subject at a same time. Therefore, even if the subject moves, a captured image is not transformed.

If the CMOS image sensor applies the rolling shutter method, one or several pixels sequentially read the optical image. Therefore, if the subject is moving or a photographing apparatus is being moved, a captured image may be transformed. Accordingly, if a subject that is moving is captured, a photographing apparatus applying the rolling shutter method has difficulty capturing a normal image.

A technique for compensating for an image distortion of the rolling shutter method is classified into an optical image stabilizer (OIS) technique and a digital image stabilizer (DIS) technique.

The OIS technique refers to a method by which a motion of a photographing apparatus is measured by using a gyro-sensor, and an image sensor or a lens of the photographing apparatus is moved in an opposite direction in order to compensate for the motion of the photographing apparatus. The OIS technique is very effective, but is costly. Also, if the motion of the photographing apparatus exceeds a displacement range provided by the OIS technique, there is no compensation for the rolling shutter phenomenon.

The DIS technique refers to a method by which a motion between images is estimated by using a digital signal processing method, wherein a distortion of an image is compensated for according to the estimated motion.

However, the DIS technique has problems with a calculation amount and accuracy. In detail, a large amount of calculation is required to estimate a motion between images in a camcorder or a camera which is to process a moving picture in real time. Also, a motion of a photographing apparatus is estimated on the assumption that the photographing apparatus moves at a constant velocity. Therefore, an accuracy problem exists.

SUMMARY

One or more exemplary embodiments provide a photographing apparatus, a motion estimating apparatus, an image compensating method, a motion estimating method, and a computer-readable recording medium, all of which can check a uniformly accelerated motion through continuously captured images.

Additional aspects and advantages of the present general inventive concept will be set forth in part in the description which follows and, in part, will be obvious from the description, or may be learned by practice of the general inventive concept.

The foregoing and/or other features and utilities of the present general inventive concept may be achieved by providing a photographing apparatus. The photographing apparatus may include an image sensing unit which continuously captures a plurality of images by using a rolling shutter method, and an image processor which compensates a uniformly accelerated motion of the photographing apparatus by using the plurality of images.

The photographing apparatus may further include a motion estimator which estimates the uniformly accelerated motion of the photographing apparatus by using the plurality of images, and the image processor may compensate for the plurality of captured images based on the estimated uniformly accelerated motion.

The motion estimator may include a comparator which compares the plurality of images with one another to check displacements among the plurality of images, a velocity calculator which calculates a uniform acceleration function of a motion velocity of the photographing apparatus according to the checked displacements, and a position calculator which calculates a position function of a position change of the photographing apparatus by using the calculated uniform acceleration function.

The comparator may compare pixel lines of each of the plurality of images to check a position of a pixel line in another image based on a pixel line of one of the plurality of images in order to check a displacement of the pixel line.

The comparator may compare preset pixel groups of pixel lines of each of the plurality of images to check a position of a pixel group in another image based on a pixel group of one of the plurality of captured images in order to check a displacement of the pixel group.

The comparator may check a displacement of each of a plurality of pixel lines in the image.

The velocity calculator may calculate the uniform acceleration function of the motion velocity of the photographing apparatus based on an average of the displacements of the plurality of pixel lines.

The uniform acceleration function may be a linear function of time as in the Equation below:

$$v_n(t) = v_{n,0} + a(t-n) \quad n \le t < n+1 \quad (1)$$

wherein t denotes time, n denotes a number of an image, Vn(t) denotes a velocity of the photographing apparatus at the time t, $v_{n,0}$ denotes an initial velocity of the photographing apparatus at an $n^{th}$ image, and a denotes an acceleration constant.

The initial velocity $v_{n,0}$ of the photographing apparatus may be calculated by using the Equation below:

$$v_{n,0} = GMV(n-1) - \frac{1}{6}(GMV(n) - 2GMV(n-1) + GMV(n-2))$$

wherein $v_{n,0}$ denotes the initial velocity of the photographing apparatus at the $n^{th}$ image, and GMV denotes a displacement of a particular image.

The position calculator may integrate the calculated uniform acceleration function to calculate the position function of the position change of the photographing apparatus, wherein the position function is a quadratic function of time.

The motion estimator may estimate a uniformly accelerated motion of the image sensing unit in one axis direction and a uniformly accelerated motion of the image sensing unit in a direction perpendicular to the one axis direction.

The motion estimator may estimate at least one of a uniformly accelerated motion in a yaw direction based on a center of the image sensing unit, a uniformly accelerated motion in a pitch direction based on the center of the image sensing unit, and a uniformly accelerated motion in a roll direction based on the center of the image sensing unit.

The motion estimator may divide a captured image into a plurality of areas and estimate uniformly accelerated motions of the plurality of areas.

The motion estimator may estimate uniformly accelerated motions of the plurality of images.

The foregoing and/or other features and utilities of the present general inventive concept may also be achieved by providing a motion estimating apparatus. The motion estimating apparatus may include an input unit which receives a plurality of images which are captured by using a rolling shutter method, and a calculator which calculates a position function of a position change of a photographing apparatus, which captures the plurality of images, by using the plurality of images.

The calculator may include a comparator which compares the plurality of images with one another to check displacements among the plurality of images, a velocity calculator which calculates a uniform acceleration function of a motion velocity of the photographing apparatus according to the checked displacements, and a position calculator which calculates the position function of the position change of the photographing apparatus by using the calculated uniform acceleration function.

The calculator may calculate a first position function of the photographing apparatus in one axis direction and a second position function of the photographing apparatus in a direction perpendicular to the one axis direction.

The calculator may calculate at least one of a first rotation function of the photographing apparatus in a yaw direction, a second rotation function of the photographing apparatus in a pitch direction, and a third rotation function of the photographing apparatus in a roll direction.

The calculator may estimate uniformly accelerated motions of the plurality of images.

The foregoing and/or other features and utilities of the present general inventive concept may also be achieved by providing a method of compensating an image in a photographing apparatus. The method may include continuously capturing a plurality of images by using a rolling shutter method and compensating a uniformly accelerated motion of the photographing apparatus by using the plurality of captured images.

The method may further include estimating the uniformly accelerated motion of the photographing apparatus by using the plurality of images, wherein the plurality of images are compensated based on the estimated uniformly accelerated motion.

The estimation of the uniformly accelerated motion of the photographing apparatus may include comparing the plurality of images with one another to check displacements among the plurality of images, calculating a uniform acceleration function of a motion velocity of the photographing apparatus according to the checked displacements, and calculating a position function of a position change of the photographing apparatus by using the calculated uniform acceleration function.

Pixel lines of each of the plurality of images may be compared to check a position of a pixel line in another image based on a pixel line of one of the plurality of images in order to check a displacement of the pixel line.

Preset pixel groups of pixel lines of each of the plurality of images may be compared to check a position of a pixel group in another image based on a pixel group of one of the plurality of images in order to check a displacement of the pixel group.

The displacement of a plurality of pixel lines in the image may be checked.

The uniform acceleration motion of the motion velocity of the photographing apparatus may be calculated based on an average of the displacements of the plurality of pixel lines.

The uniform acceleration function may be a linear function of time as in the Equation below:

$$v_n(t) = v_{n,0} + a(t-n) \quad n \le t < n+1$$

where t denotes time, n denotes a number of an image, Vn(t) denotes a velocity of the photographing apparatus at the time t, $v_{n,0}$ denotes an initial velocity of the photographing apparatus at an $n^{th}$ image, and a denotes an acceleration constant.

The initial velocity $v_{n,0}$ of the photographing apparatus may be calculated by using the Equation below:

$$v_{n,0} = GMV(n-1) - \frac{1}{6}(GMV(n) - 2GMV(n-1) + GMV(n-2))$$

where $v_{n,0}$ denotes the initial velocity of the photographing apparatus at the $n^{th}$ image, and GMV denotes a displacement of a particular image.

A first uniform acceleration function of the photographing apparatus in one axis direction and a second uniform acceleration function of the photographing apparatus in a direction perpendicular to the one axis direction may be calculated.

At least one of a uniform acceleration function in a yaw direction based on a center of the image sensing unit, a uniform acceleration function in a pitch direction based on the center of the image sensing unit, and a uniform acceleration function in a roll direction based on the center of the image sensing unit may be calculated.

A captured image may be divided into a plurality of areas, and uniform acceleration functions of the plurality of areas may be calculated.

The calculated uniform acceleration function may be integrated to calculate the position function of the position change of the photographing apparatus, wherein the position function is a quadratic function of time.

Uniform accelerated motions of the plurality of images may be estimated.

The foregoing and/or other features and utilities of the present general inventive concept may also be achieved by providing a motion estimating method. The motion estimating method may include receiving a plurality of images which are captured by using a rolling shutter method, and calculating a position function of a position change of a photographing apparatus, which captures the plurality of images, by using the plurality of images.

The calculation of the position function may include comparing the plurality of images with one another to check displacements among the plurality of images, calculating a uniform acceleration function of a motion velocity of the photographing apparatus according to the checked displacements, and calculating the position function of the position change of the photographing apparatus by using the calculated uniform acceleration function.

A first position function of the photographing apparatus in one axis direction and a second position function of the photographing apparatus in a direction perpendicular to the one axis direction may be calculated.

At least one of a first rotation function of the photographing apparatus in a yaw direction, a second rotation function of the photographing apparatus in a pitch direction, and a third rotation function of the photographing apparatus in a roll direction may be calculated.

Uniformly accelerated motions of the plurality of images may be estimated.

The foregoing and/or other features and utilities of the present general inventive concept may also be achieved by providing a computer-readable recording medium comprising a program for executing a motion estimating method. The motion estimating method may include receiving a plurality of images which are captured by using a rolling shutter method, and calculating a position function of a position change of a photographing apparatus, which captures the plurality of images, by using the plurality of captured images.

BRIEF DESCRIPTION OF THE DRAWING FIGURES

These and/or other features and utilities of the present general inventive concept will become apparent and more readily appreciated from the following description of the embodiments, taken in conjunction with the accompanying drawings of which:

FIGS. 5 through 8D are views illustrating experimental results of a photographing apparatus according to an exemplary embodiment of the present general inventive concept;

DETAILED DESCRIPTION OF THE PREFERRED EMBODIMENTS

Figure 1:
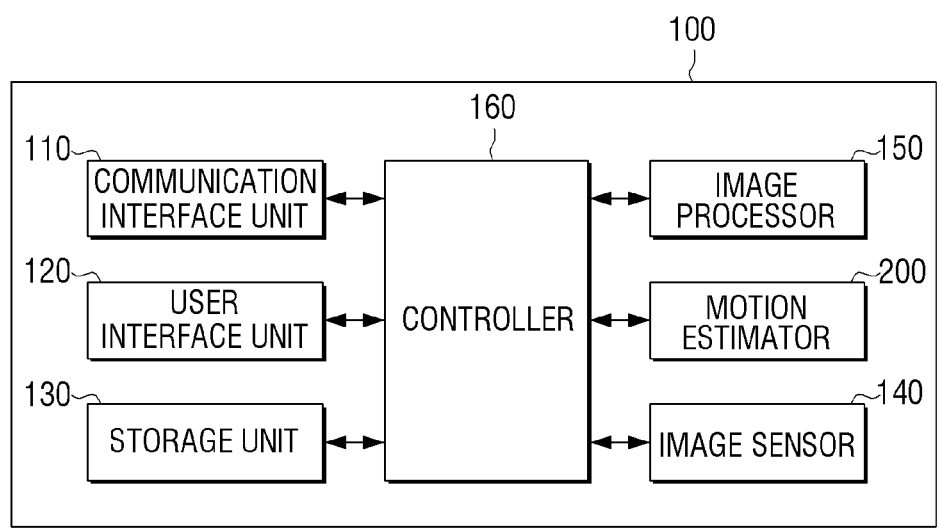
FIG. 1 is a block diagram illustrating a photographing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a photographing apparatus 100 as an electronic apparatus according to an exemplary embodiment of the present general inventive concept.

Referring to FIG. 1, the photographing apparatus 100 includes a communication interface unit 110, a user interface unit 120, a storage unit 130, an image sensing unit 140, a motion estimator 200, an image processor 150, and a controller 160. The photographing apparatus 100 may be a digital camera, a camcorder, a mobile phone, a portable multimedia player (PMP), a webcam, or the like which can continuously capture a plurality of images from one or more objects.

The communication interface unit 110 is formed to connect the photographing apparatus 100 to at least one terminal apparatus (not illustrated). The communication unit 100 may be accessed in a wireless or wired way through a local area network (LAN) or the Internet or through a universal serial bus (USB) port or a Bluetooth module.

The communication interface unit 110 transmits a signal (or data) corresponding to contents, which are stored in the photographing apparatus 100, to an external terminal apparatus (not illustrated). In detail, the communication interface unit 110 may transmit a signal (or data) corresponding to an image or a moving picture file stored in the storage unit 130, which will be described later, to the external terminal apparatus or an external server.

If the user interface unit 120 includes a plurality of functional keys which are used by a user to set or select various functions supported by the photographing apparatus 100, the user interface unit 120 may display various types of information. The user interface unit 120 may be realized as a device which simultaneously realizes an input and an output like a touch pad. The user interface unit 120 may be realized as a combination of input units, such as a plurality of buttons, and a display apparatus, such as a liquid crystal display (LCD) monitor, an organic light-emitting diode (OLED) monitor, or the like.

The user interface unit 120 receives various control commands, including a capture start command, a capture end command, etc., from the user. The user interface unit 120 also receives setups related to capturing. In detail, the user interface unit 120 may receive setups including a file format type of a captured image, a resolution of the captured image, a frame rate when capturing a moving picture, digital zoom-in/zoom-out, an auto white balance (AWB), an auto focus (AF), an auto exposure (AE), etc.

The user interface unit 120 may be a display unit to display the captured image. In detail, if the photographing apparatus 100 is capturing a moving picture, the user interface unit 120 may display a moving picture captured by the image sensing unit 140 which will be described later. Also, the user interface unit 120 may display various types of contents stored in the storage unit 130 according to a playback command of the user.

The storage unit 130 stores the captured image. In detail, the storage unit 130 may divide an image captured by the image sensing unit 140 into frames and temporarily store the frames. The storage unit 130 may store an image which is image-processed by the image processor 150, which will be described later. The storage unit 130 may also store contents (i.e., a plurality of compressed captured images) which are generated by the image processor 150 using the image.

The storage unit 130 may be realized as a storage medium of the photographing apparatus 100 or an external storage medium. For example, the storage unit 130 may be realized as a removable disk, such as a USB memory, a flash memory, or the like, a storage medium connected to the photographing apparatus 100, a web server through a network, or the like.

The image sensing unit 140 continuously captures a plurality of images by using a rolling shutter method. In detail, the image sensing unit 140 may include a lens, an image sensor, and an analog-to-digital converter (ADC). The lens condenses light of a subject to form an optical image in a photographing area. The image sensor converts the light incident through the lens into an electric signal. The ADC converts an analog signal into a digital signal and outputs the digital signal as the image.

The image sensor may include pixels, each formed with a complementary metal oxide semiconductor (CMOS) optical sensor. Each of the pixels of the imaging sensor may read the optical image according to the rolling shutter method. Here, the rolling shutter method refers to a method of sequentially reading the optical image using one or several pixels of a photographing area thereof. Hereinafter, an optical image is read in a unit of a pixel line. However, the present inventive concept may be applied to a case where an optical image is read in a unit of a combination of a plurality of pixel lines or a case where an optical image is read in a unit of at least one pixel.

Figure 2:
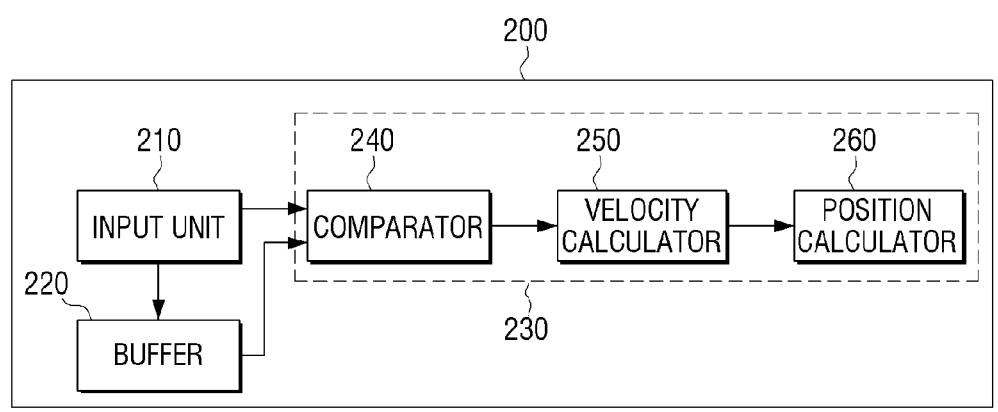
FIG. 2 is a block diagram illustrating a motion estimating apparatus according to an exemplary embodiment of the present general inventive concept.

The motion estimator 200 estimates a uniformly accelerated motion of the photographing apparatus 100 by using a plurality of captured images. Detailed structure and operation of the motion estimator 200 will be described later with reference to FIGS. 2 and 3. As illustrated in FIG. 2, the motion estimator 200 may be realized as an additional motion estimating apparatus which separates from the photographing apparatus 100 and may be connectable to the photographing apparatus 100 through a wired or wireless communication.

The image processor 150 compensates the uniformly accelerated motion of the photographing apparatus 100 by using the plurality of captured images. In detail, the image processor 150 may compensate the uniformly accelerated motion of the photographing apparatus 100 with respect to each of images captured by the image sensing unit 140, based on a uniformly accelerated motion estimated by the motion estimator 200.

In more detail, the image processor 150 calculates a displacement of each pixel line on an x axis according to a uniformly accelerated motion which is estimated on the x axis by the motion estimator 200. The image processor 150 compensates for a displacement of each pixel line on the x axis by a displacement of a corresponding pixel line which is calculated on the x axis. The image processor 150 calculates a displacement of each pixel line on a y axis according to a uniformly accelerated motion which is estimated on the y axis by the motion estimator 200. The image processor 150 compensates for a displacement of each pixel line on the y axis by a displacement of a corresponding pixel line which is calculated on the y axis in order to compensate for a motion of the photographing apparatus 100 with respect to each of images captured by the image sensing unit 140.

The image processor 150 calculates displacements of pixel lines on the x and y axes according to uniformly accelerated motions which are estimated by the motion estimator 200 in yaw, pitch, and roll directions. The image processor 150 compensates for a displacement of each pixel line on the y axis by a displacement of a corresponding pixel line, which is calculated on the y axis, to compensate for the motion of the photographing apparatus 100 with respect to each of the images captured by the image sensing unit 140.

Also, the image processor 150 may perform signal processing, such as digital zooming, an AWB, an AF, an AE, or the like, in order to convert a format of an image signal output from the image sensing unit 140 or an image signal with a motion compensation of the photographing apparatus 100 and to adjust a scale of the image signal.

The image processor 150 may transmit an image captured by the image sensing unit 140 or a signal-processed image to the user interface unit 120 to display the captured image on a display unit.

The image processor 150 may encode the signal-processed image and store the encoded image in the storage unit 130 so that the captured image is stored. In the present exemplary embodiment, contents of receiving a voice signal have not been described. However, the image processor 150 may process the voice signal when the captured image is processed. That is, the image processor 150 may combine the captured image with a voice signal received through an additional internal microphone or an external microphone to generate a moving picture file and store the generated moving picture file in the storage unit 130.

The controller 160 may control elements of the photographing apparatus 100. In detail, if the image sensing unit 140 continuously captures a plurality of images, the controller 160 controls the motion estimator 200 to estimate a uniformly accelerated motion of the photographing apparatus 100. Also, the controller 160 may control the image processor 150 to compensate the plurality of captured images based on the estimated uniformly accelerated motion.

As described above, the photographing apparatus 100 according to the present exemplary embodiment may estimate a uniformly accelerated motion thereof by using continuously captured images and compensate the captured images according to the estimated uniformly accelerated motion. Therefore, the photographing apparatus 100 may compensate for an image distortion caused by a rolling shutter thereof. Since the photographing apparatus 100 estimates the uniformly accelerated motion thereof, the motion of the photographing apparatus 100 may be further accurately estimated.

Although descriptions of the present exemplary embodiment are based on a CMOS image sensor, the present exemplary embodiment is not limited thereto. The present general inventive concept may be applied to another type of an image sensor which is operable according to a rolling shutter method.

FIG. 2 is a block diagram illustrating a motion estimating apparatus 200 according to an exemplary embodiment.

Referring to FIG. 2, the motion estimating apparatus 200 may be similar to or the same as the motion estimator 200 of FIG. 1. In detail, the motion estimating apparatus 200 includes an input unit 210, a buffer 220, and a calculator 230.

The input unit 210 receives a plurality of images which are captured by using a rolling shutter method. In detail, the input unit 210 sequentially receives a plurality of images captured by the image sensing unit 140 of FIG. 1. The input unit 210 transmits currently received images to the buffer 220 and the calculator 230.

The buffer 220 temporarily stores the plurality of images input through the input unit 210. The buffer 220 transmits the temporarily stored images to the calculator 230. In the present exemplary embodiment, the input unit 210 and the buffer 220 provide a plurality of images to the calculator 230. However, the buffer 220 may transmit all of the plurality of images to the calculator 230.

The calculator 230 calculates a position function of a position change of the photographing apparatus 100 which has captured the plurality of images by using the plurality of input images. The calculator 230 may include a comparator 240, a velocity calculator 250, and a position calculator 260.

The comparator 240 compares the plurality of input images with one another to check displacements among the plurality of images. In detail, the comparator 240 compares pixel lines of a plurality of images which are continuously captured to check a position of a pixel line in another image based on a pixel line of one of the plurality of images in order to check a displacement of the pixel line. The comparator 240 may compare preset pixel groups of pixel lines of each of a plurality of continuously captured images to check positions of pixel groups in another image based on pixel groups of one of the plurality of images in order to check displacements of the pixel groups. The comparator 240 may check displacements of all of a plurality of pixel lines which have comparable objects.

The comparator 240 may average the displacements of the plurality of pixel lines to calculate displacements of images.

The velocity calculator 250 calculates a uniform acceleration function of a motion velocity of the photographing apparatus 100 according to the checked displacements. In detail, the velocity calculator 250 may calculate the uniform acceleration function of the motion velocity of the photographing apparatus 100 based on the displacements of the pixel lines checked by the comparator 240. Since the uniform acceleration function requires at least three displacement values, the velocity calculator 250 may calculate the uniform acceleration function by using two displacement values among three consecutive images. Also, the velocity calculator 250 may calculate the uniform acceleration function by using displacement values of a plurality of pixel lines between two consecutive images.

If the comparator 240 checks displacements of a plurality of pixel lines, the velocity calculator 250 averages the checked displacements of the pixel lines to calculate a displacement (or a rotation displacement) of an image (or a frame) and calculates a uniform acceleration function of a motion velocity (or a rotation velocity) of the photographing apparatus 100 by using the calculated displacement. As described above, the uniform acceleration function requires at least three displacement values. In this case, the velocity calculator 250 may calculate the uniform acceleration function by using a displacement (or a rotation displacement) among three images. In the above-description, the velocity calculator 250 calculates a displacement of an image. However, the comparator 240 may calculate a displacement of an image.

The uniform acceleration function calculated by the velocity calculator 250 is a linear function of time as in Equation 1 above. A method of calculating constants (an initial velocity and an acceleration constant of a photographing apparatus) of Equation 1 will be described later with reference to FIG. 3.

The position calculator 260 calculates a position function of a position change of the photographing apparatus 100 by using the calculated uniform acceleration function. In detail, the position calculator 260 may integrate the uniform acceleration function calculated by the velocity calculator 250 to calculate a position function that is a quadratic function of time. The calculation of the position function may be performed with respect to each image.

As described above, the motion estimating apparatus 200 according to the present exemplary embodiment may estimate a uniformly accelerated motion of the photographing apparatus 100 by using continuously captured images. Therefore, the motion estimating apparatus 200 may further accurately estimate a motion of the photographing apparatus 100.

As described with reference to FIG. 2, the calculator 230 calculates only a position function with respect to one axis. However, a position function with respect to an x axis and a position function with respect to a y axis are independent of each other. Therefore, the calculator 230 may calculate a first position function of the photographing apparatus 100 in one axis direction (e.g., on an x axis) by using a method as described above and a second position function in a direction (e.g., on a y axis) perpendicular to the one axis direction by using the same method in order to calculate position functions of the photographing apparatus 100 in two axis directions.

The calculator 230 may compare sizes of subjects in a captured image to calculate a third position function on a z axis. In this case, the motion estimating apparatus 200 may estimate a 3-dimensional uniformly accelerated motion of the photographing apparatus 100.

As described above, the calculator 230 calculates only a position function on a coordinate plane. However, the calculator 230 may calculate a first rotation function in a yaw direction based on a center of the image sensing unit 140, a second rotation function in a pitch direction based on the center of the image sensing unit 140, and a third rotation function in a roll direction based on the center of the image sensing unit 140 to calculate rotation functions with respect to rotation directions of the photographing apparatus 100.

In the present exemplary embodiment, one uniform acceleration function is calculated with respect to one axis. However, a captured image may be divided into a plurality of areas, and uniform acceleration functions of the plurality of areas (a plurality of uniform acceleration functions) may be calculated. For example, an image may be divided into upper and lower areas, and uniformly accelerated motions of the upper and lower areas may be respectively calculated.

As described with reference to FIGS. 1 and 2, only a uniformly accelerated motion of the photographing apparatus 100 is estimated. However, if the photographing apparatus 100 is fixed by an apparatus such as a tripod, and captures a moving subject, not a uniformly accelerated motion of the photographing apparatus 100, but an estimation and compensation for a uniformly accelerated motion of the moving subject may be obtained.

Figure 3:
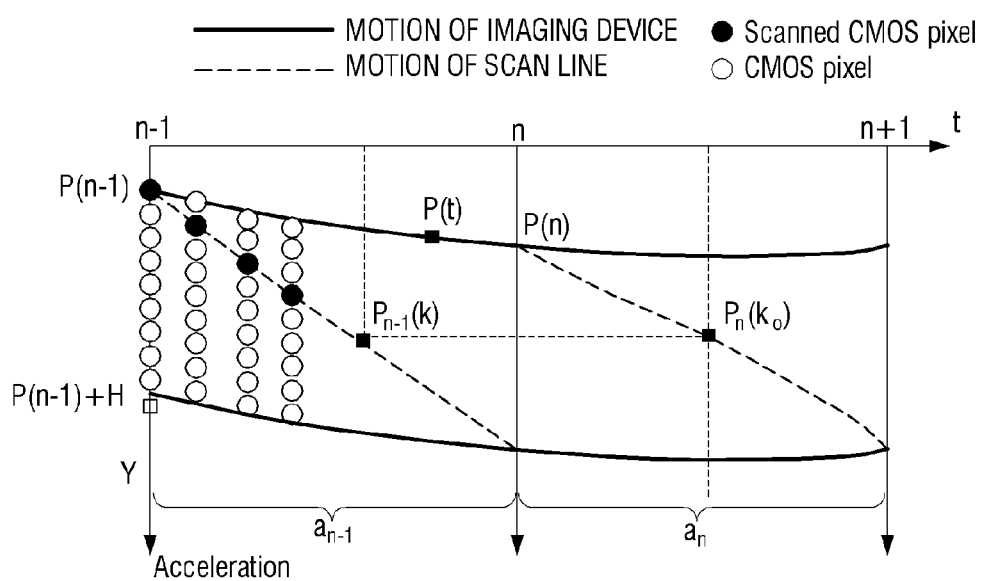
FIGS. 3 and 4 are graphs illustrating an operation of the motion estimating apparatus of FIG. 2.
Figure 4:
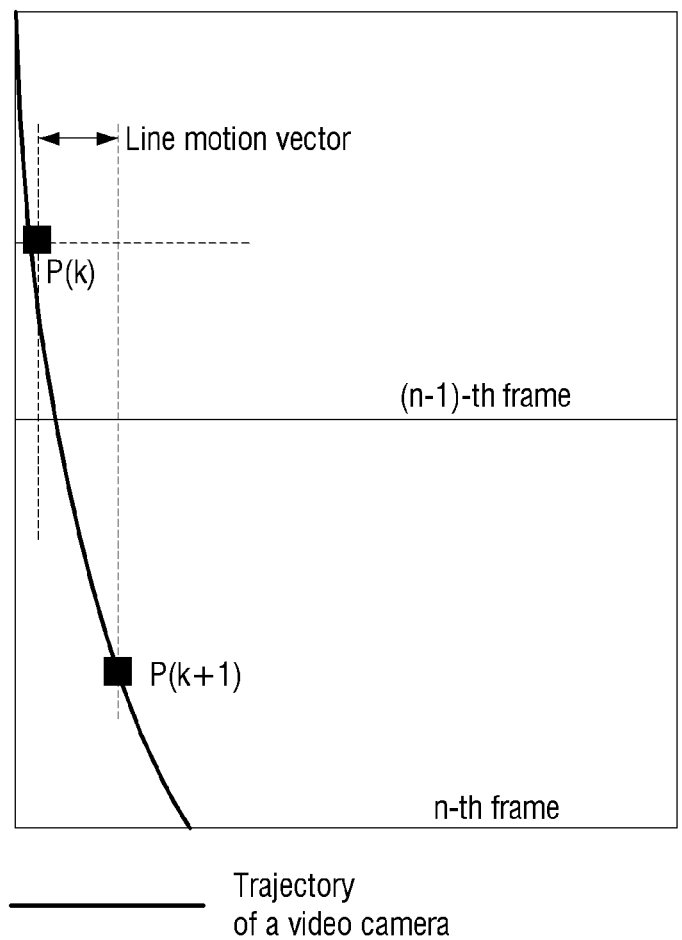
Figure 5:
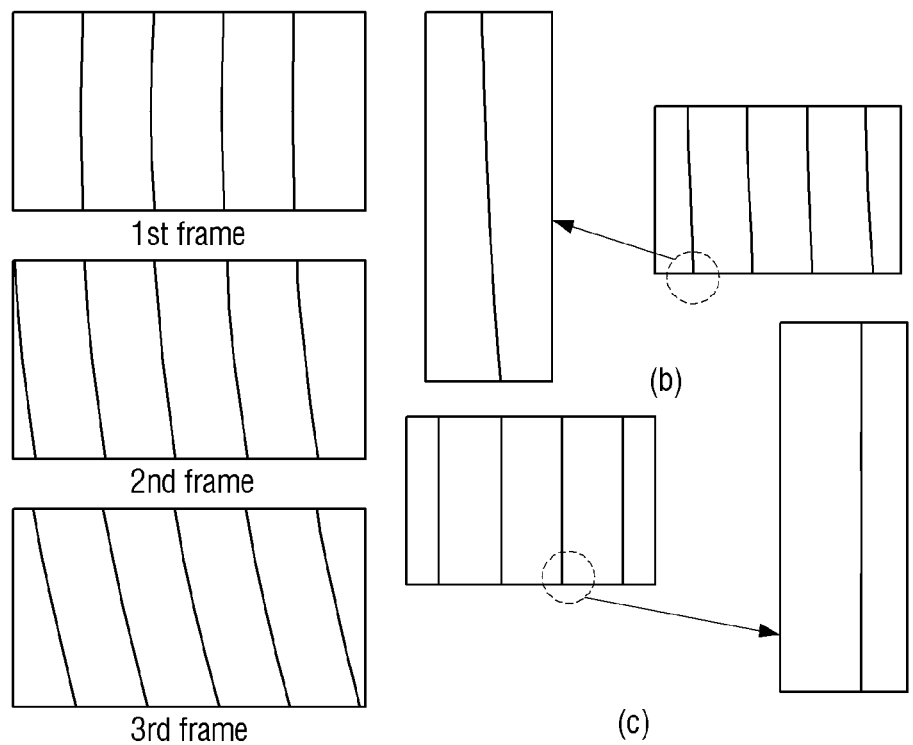

FIGS. 3 and 4 are views illustrating an operation of the motion estimating apparatus 200 of FIG. 2.

A rolling shutter phenomenon occurs when a subject moves or a camera shakes. Therefore, a motion of the photographing apparatus 100 and a motion of the subject are to be considered in order to compensate for the rolling shutter phenomenon. However, for descriptive convenience, it will be described that the subject is fixed. In detail, the photographing apparatus 100 has a frame rate of 30 fps or more. Therefore, it is assumed that a motion of a subject is not greatly displaced compared to a motion of the photographing apparatus 100 at the frame rate of 30 fps.

A displacement of the photographing apparatus 100 may be calculated by integrating a velocity of the photographing apparatus 100. Therefore, a method of calculating the velocity of the photographing apparatus 100 will be described first. A method of calculating a uniform acceleration function of a vertical motion of the photographing apparatus 100 will now be described with reference to FIG. 3.

FIG. 3 illustrates a motion path of the photographing apparatus 100 and a motion path of a pixel line if the photographing apparatus 100 vertically moves. Referring to FIG. 3, an x axis denotes time t. In detail, a capturing completing time of a first image is normalized as 1. A y axis denotes displacements of an image sensor and the photographing apparatus 100. White circles respectively denote pixel lines of the image sensor, and black circles denote pixel lines which are being read.

If the photographing apparatus 100 moves in a direction of the y axis when capturing, reading times of pixel lines are different from one another. Therefore, a subject goes down a little more at a reading time of a second pixel than at a reading time of a first pixel line.

If the photographing apparatus 100 moves at a uniform acceleration, a motion velocity of the photographing apparatus 100 at an $n^{th}$ image may be represented as in Equation 1 below:

$$v_n(t) = v_{n,0} + a(t-n) \quad n \leq t < n+1 \quad (1)$$

wherein t denotes time, n denotes a number of an image, Vn(t) denotes a velocity of the photographing apparatus 100 at the time t, $v_{n,0}$ denotes a velocity of the photographing apparatus 100 when the $n^{th}$ image starts to be captured, and a denotes an acceleration constant.

Equation 1 above may be integrated to be represented as a position function as in Equation 2 below:

$$P(t) = \begin{cases} P(n-1) + v_{n-1,0}(t-n+1) + \frac{1}{2}a_{n-1}(t-n+1)^2 & n-1 \leq t < n \\ P(n) + v_{n,0}(t-n) + \frac{1}{2}a_n(t-n)^2 & n \leq t < n+1 \end{cases} \quad (2)$$

wherein t denotes time, n denotes a number of an image, P(t) denotes a position of the photographing apparatus 100 at the time t, $v_{n,0}$ denotes the velocity of the photographing apparatus 100 when the $n^{th}$ image starts to be captured, and $v_{n-1,0}$ denotes the velocity of the photographing apparatus 100 when an $n-1^{th}$ image starts to be captured. As shown above, the position of the photographing apparatus 100 may be represented as a quadratic function of the time t.

A position of a $k^{th}$ pixel line in the $n^{th}$ image may be represented as in Equation 3 below. In detail, the position of the $k^{th}$ pixel line in the $n^{th}$ image is equal to an addition of a position of a $k^{th}$ pixel line in the photographing apparatus 100 to the position P(t) of the photographing apparatus 100. In the present exemplary embodiment, it is assumed that the position of the photographing apparatus 100 is fixed to a first pixel line. However, the position of the photographing apparatus 100 may be fixed to a last pixel line or a central pixel line. For the description convenience, the position of the photographing apparatus 100 corresponds to the first pixel line.

$$P_n(k) = P\left(n + \frac{k}{H}\right) + k \quad (3)$$

wherein n denotes a number of an image, k denotes a number of a pixel line, $P_n(k)$ denotes the position of the $k^{th}$ pixel line in the $n^{th}$ image, and H denotes the total number of pixel lines.

If a subject is fixed, and the photographing apparatus 100 moves in a vertical direction, a shape of a particular subject exists on the $k^{th}$ pixel line in the $n-1^{th}$ image. However, after a predetermined time elapses, the shape of the particular subject may exist on a first pixel line in the $n^{th}$ image. This may be arranged as in Equation 4 below:

$$P_{n-1}(k) = P_n(k_0) = P\left(n - 1 + \frac{k}{H}\right) + k = P\left(n + \frac{k_0}{H}\right) + k_0 \quad (4)$$

wherein $P_{n-1}(k)$ denotes the position of the $k^{th}$ pixel line in the $n-1^{th}$ image, and $P_n(k_0)$ denotes a position of the first pixel line in the $n^{th}$ image.

A position movement of the photographing apparatus 100 may be represented as in Equation 5 by using Equation 2:

$$P(n) - P(n-1) = v_{n-1,0} + \tfrac{1}{2}a_{n-1} \quad (5)$$

wherein P(n) denotes the position of the photographing apparatus 100 in the $n^{th}$ image, P(n−1) denotes the position of the photographing apparatus 100 in the $n-1^{th}$ image, $V_{n-1,0}$ denotes an initial velocity of the photographing apparatus 100 in the $n-1^{th}$ image, and $a_{n-1}$ denotes an acceleration constant of the photographing apparatus 100 in the $n-1^{th}$ image.

If the photographing apparatus 100 continuously captures a plurality of images, an initial velocity of the photographing apparatus 100 in a particular image is equal to a last velocity of the photographing apparatus 100 in a previous image. Therefore, the initial velocity may be represented as in Equation 6 below:

$$v_{n,0} = v_{n-1,0} + a_{n-1} \quad (6)$$

wherein $V_{n,0}$ denotes the initial velocity of the photographing apparatus 100 in the $n^{th}$ image, $v_{n-1,0}$ denotes the initial velocity in the $n-1^{th}$ image, and $a_{n-1}$ denotes an acceleration constant in the $n-1^{th}$ image.

Therefore, if Equations 2 through 6 are arranged, a displacement (or a motion vector) of the $k^{th}$ pixel line in the $n-1^{th}$ image may be represented as in Equation 7 below:

$$mv_{n-1}(k) = k - k_0 \qquad (7)$$
$$= v_{n-1,0}\left(1 - \frac{k}{H} + \frac{k_0}{H}\right) + \frac{1}{2}a_{n-1}\left(1 - \left(\frac{k}{H}\right)^2 + \frac{2k_0}{H}\right) +$$
$$\frac{1}{2}a_n\left(\frac{k_0}{H}\right)^2$$

wherein $mv_{n-1}(k)$ denotes the motion displacement of the $k^{th}$ pixel line in the $n-1^{th}$ image.

If the motion of the photographing apparatus 100 is not excessive, a displacement of a pixel line may not be greater than a vertical length of the image sensor. This assumption may be represented as in Equation 8 below:

$$mv_{n-1}(k) \ll H \rightarrow \frac{mv_{n-1}(k)}{H} \ll 1 \qquad (8)$$

Therefore, if Equation 8 is applied, $$\left(1 - \frac{k}{H} + \frac{k_0}{H}\right) \text{ and } \left(1 - \left(\frac{k}{H}\right)^2 + \frac{2k_0}{H}\right)$$

of Equation 7 may be respectively represented as in Equations 9 and 10:

$$1 - \frac{k}{H} + \frac{k_0}{H} = 1 - \frac{mv_{n-1}(k)}{H} \approx 1 \qquad (9)$$

$$1 - \left(\frac{k}{H}\right)^2 + \frac{2k_0}{H} = 1 - \left(\frac{k}{H}\right)^2 + \frac{2(k - mv_{n-1}(k))}{H} \approx 1 - \left(\frac{k}{H}\right)^2 + \frac{2k}{H} \qquad (10)$$

If Equations 9 and 10 are applied to Equation 7, the displacement (or the motion vector) of the $k^{th}$ pixel line in the $n-1^{th}$ image may be represented as in Equation 11:

$$mv_{n-1}(k) = v_{n-1,0} + \frac{1}{2}a_{n-1}\left(1 - \left(\frac{k}{H}\right)^2 + \frac{2k}{H}\right) + \frac{1}{2}a_n\left(\frac{k_0}{H}\right)^2 \qquad (11)$$

A calculation of a displacement (hereinafter referred to as a global motion vector) of an image by using a displacement of a pixel line obtained as described above may be performed by using various methods. In detail, a global motion vector may be calculated by using only a displacement of an arbitrary pixel line or by using an average of displacements of all of pixel lines which include an area matching with a next image. A method of calculating a global motion vector by using an average of displacements of all of pixel lines including an area matching with a next image in order to enhance accuracy will now be described.

If a global motion vector is an average of displacements of all pixel lines as described above, the global motion vector may be represented as in Equation 12:

$$GMV(n-1) = \frac{1}{H}\int_0^H mv_{n-1}(k)\,dk = v_{n-1,0} + \frac{5}{6}a_{n-1} + \frac{a_n}{2H^2}\int_0^H k_0^2\,dk \qquad (12)$$

wherein GMV(n−1) denotes the global motion vector in the $n-1^{th}$ image, H denotes the total number of pixel lines, and $k_0$ denotes a variable related to k which is not a constant.

If Equation 8 is used, $$\frac{a_n}{2H^2}\int_0^H k_0^2\,dk$$

of Equation 12 may be represented as in Equation 13 below:

$$\frac{a_n}{2}\int_0^H \left(\frac{k_0}{H}\right)^2 dk \approx \frac{a_n}{2}\frac{1}{3} = \frac{1}{6}a_n \qquad (13)$$

If Equation 13 is applied to arrange Equation 12, Equation 14 below may be obtained:

$$GMV(n-1) = v_{n-1,0} + \frac{5}{6}a_{n-1} + \frac{1}{6}a_n \qquad (14)$$
$$= v_{n-1,0} + a_{n-1} + \frac{1}{6}(a_n - a_{n-1})$$
$$= v_{n,0} + \frac{1}{6}(a_n - a_{n-1})$$

A global motion vector among continuous images may be represented as in Equation 15 below.

(15)

GMV(n)−GMV(n−1)=$a_n$+⅙($a_{n-1}$−2$a_n$+$a_{n-1}$)(GMV(n)−GMV(n−1)−(GMV(n−1)−GMV(n−2))=$a_n$−$a_{n-1}$+⅙($a_{n+1}$−3$a_n$+3$a_{n-1}$−$a_{n-2}$) (15)

If Equations 14 and 15 are combined and arranged, Equation 16 below may be obtained:

$$GMV(n-1) - \frac{1}{6}(GMV(n) - 2GMV(n-1) + GMV(n-2)) = \qquad (16)$$
$$v_{n,0} - \frac{1}{36}(a_{n+1} - 3a_n + 3a_{n-1} - a_{n-2}) = v_{n,0} - \frac{1}{36}(d_{n+1} - 2d_n + d_{n-1})$$

wherein $d_n$ denotes an acceleration difference between continuous images. If a frame rate of the photographing apparatus 100 is considered, an acceleration difference caused by hand-shaking is not large. Therefore, $d_{n+1}-2d_n+d_{n-1}$ may be 0.

Therefore, Equation 16 may be arranged as in Equation 17 below.

$$v_{n,0} = GMV(n-1) - \frac{1}{6}(GMV(n) - 2GMV(n-1) + GMV(n-2)) \qquad (17)$$

A displacement between images may be calculated by the comparator 240 which has been described above, and thus the velocity calculator 250 may calculate an initial velocity of each of the images by using Equation 17 above. The velocity calculator 250 may also calculate an acceleration of each of the images by using the calculated initial velocity and Equation 6 above.

Therefore, the velocity calculator 250 may calculate a uniform acceleration function of a motion velocity of the photographing apparatus 100 on the y axis by using the calculated initial velocity and the calculated acceleration.

Also, as described above, the position calculator 260 may integrate the calculated uniform acceleration function to calculate a position function of a position movement of the photographing apparatus 100 on the y axis.

As described above, the motion estimating apparatus 200 according to the present exemplary embodiment may calculate a position function of the photographing apparatus 100 by using only Equations 17 and 6 and a displacement of an image. Therefore, the motion estimating apparatus 200 may estimate a motion of the photographing apparatus 100 through a relatively simple calculation. Also, the motion estimating apparatus 200 may estimate a motion of the photographing apparatus 100 on the assumption that the photographing apparatus 100 moves at a constant velocity. Therefore, the motion estimating apparatus 200 may further accurately estimate the motion of the photographing apparatus 100.

An initial velocity and an acceleration in each image may be calculated through the above-described process. Therefore, the calculated initial velocity and an acceleration constant may be applied to calculate a position movement of the photographing apparatus 100.

In the present exemplary embodiment, a position function of a vertical motion of the photographing apparatus 100 is calculated. However, a position function of a horizontal motion of the photographing apparatus 100 may be calculated by using the same method as the above-described method. A method of calculating a uniform acceleration function of the horizontal motion of the photographing apparatus 100 will now be described with reference to FIG. 4.

FIG. 4 illustrates a motion path of the photographing apparatus 100 and a motion path of a pixel if the photographing apparatus 100 moves horizontally. Referring to FIG. 4, an x axis denotes displacements of the image sensor and the photographing apparatus 100, and a y axis denotes time.

The position function of the horizontal motion of the photographing apparatus 100 may be represented as in Equation 2 above. However, a displacement of each pixel line with respect to the horizontal motion may be represented as in Equation 18 below, differently from Equation 7.

$$mv_{n-1}(k) = P(k+1) - P(k) \quad (18)$$
$$= v_{n-1,0} + \frac{1}{2}a_{n-1}a_{n-1}\frac{k}{H} + \frac{1}{2}(a_n - a_{n-1})\left(\frac{k}{H}\right)^2$$

Equation 18 may be applied to represent a global motion vector of an $n-1^{th}$ image as in Equation 19 below:

$$GMV(n-1) = \frac{1}{H}\int_0^H mv_{n-1}(k)dk = v_{n-1,0} + \frac{5}{6}a_{n-1} + \frac{1}{6}a_n \quad (19)$$

If Equation 19 is compared with Equation 14, a global motion vector on the x axis is equal to a global motion vector on the y axis.

Therefore, the velocity calculator 250 may input a displacement between images on the x axis into Equation 17 to calculate an initial velocity on the x axis. Also, the velocity calculator 250 may calculate an acceleration of each of the images on the x axis by using the calculated initial velocity on the x axis and Equation 6 above.

Therefore, the velocity calculator 250 may calculate a uniform acceleration function of a motion velocity of the photographing apparatus 100 on the x axis by using the calculated initial velocity and the acceleration on the x axis.

Also, the position calculator 260 may integrate the uniform acceleration function of the motion velocity on the x axis to calculate a position function of a position movement of the photographing apparatus 100 on the x axis.

In the above descriptions, the position functions on the x and y axes are calculated. However, a size of a subject of a previous image may be compared with a size of a subject of a next image to calculate a position function of a position movement of the photographing apparatus 100 on a z axis in order to estimate a 3-dimensional motion of the photographing apparatus 100.

Figure 9:
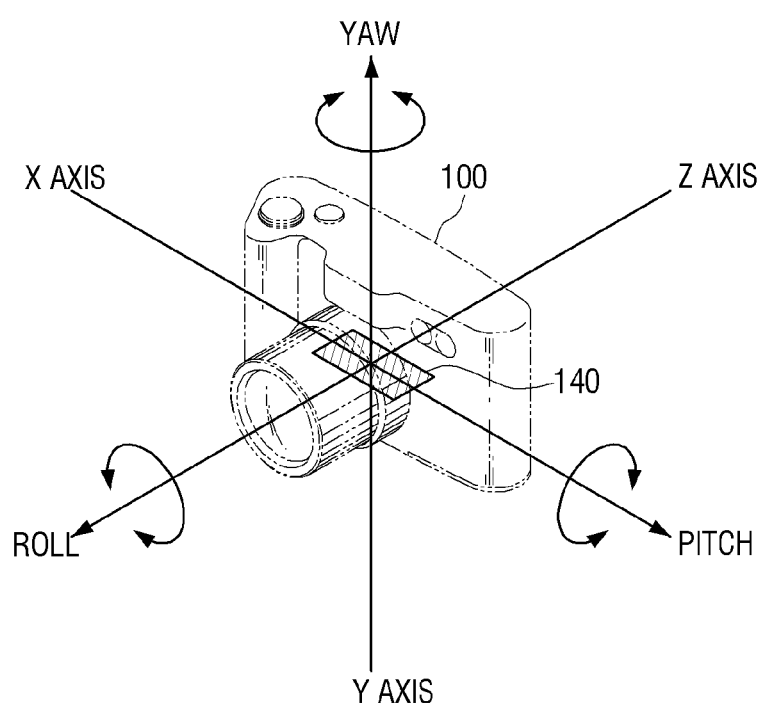
FIG. 9 is a view illustrating a motion of a photographing apparatus according to an exemplary embodiment of the present general inventive concept.

In the present exemplary embodiment, only motions of the photographing apparatus 100 on the x, y, and z axes are estimated. However, the above-described estimation method may be modified to calculate a rotation function of a rotation of the photographing apparatus 100 and estimate a rotation motion of the photographing apparatus 100 through the rotation function. In detail, as shown in FIG. 9, the photographing apparatus 100 may rotate in yaw, pitch, and roll directions. Therefore, the velocity function on the axis may be changed to calculate a velocity function of the photographing apparatus 100 in the yaw direction as in Equation 20 below. Also, a rotation motion of the photographing apparatus 100 in the yaw direction may be estimated by using the velocity function in the yaw direction. The velocity function on the y axis may be changed to calculate a velocity function of the photographing apparatus 100 in the pitch direction as in Equation 21 below. Also, a rotation motion of the photographing apparatus 100 in the pitch direction may be estimated by using the velocity function in the pitch direction. The velocity function on the z axis may be changed to calculate a velocity function of the photographing apparatus 100 in the roll direction. Also, a rotation motion of the photographing apparatus 100 in the roll direction may be estimated by using the velocity function in the roll direction.

$$V_{\psi n} = V_{\psi n,0} + a(t-n) \quad n \leq t < n+1 \quad (20)$$

wherein t denotes time, n denotes a number of an image, $V_{\psi n}(t)$ denotes a rotation velocity of the photographing apparatus 100 in a yaw rotation direction $\psi$ at the time t, $v_{\psi n,0}$ denotes a rotation velocity of the photographing apparatus 100 in the yaw rotation direction $\psi$ when the $n^{th}$ image starts to be captured, and a denotes an acceleration constant in the yaw rotation direction $\psi$.

$$V_{\theta n} = V_{\theta n,0} + a(t-n) \quad n \leq t < n+1 \quad (21)$$

wherein t denotes time, n denotes a number of an image, $V_{\theta n}(t)$ denotes a rotation velocity of the photographing apparatus 100 in a pitch rotation direction $\theta$ at the time t, $v_{\theta n,0}$ denotes a rotation velocity of the photographing apparatus 100 in the pitch rotation direction $\theta$ when the $n^{th}$ image starts to be captured, and a denotes an acceleration constant in the pitch rotation direction $\theta$.

$$V_{\phi n} = V_{\phi n,0} + a(t-n) \quad n \leq t < n+1 \quad (22)$$

wherein t denotes time, n denotes a number of an image, $V_{\phi n}(t)$ denotes a rotation velocity of the photographing apparatus 100 in a roll rotation direction $\phi$ at the time t, $v_{\phi n,0}$ denotes a rotation velocity of the photographing apparatus 100 in the roll rotation direction ϕ when the $n^{th}$ image starts to be captured, and a denotes an acceleration constant in the roll rotation direction ϕ.

In the above descriptions, only rotation motions of the photographing apparatus 100 in yaw, pitch, and roll directions are calculated. However, position functions of the photographing apparatus 100 on x, y, and z axes may be calculated, and then rotation functions of the photographing apparatus 100 in the yaw, pitch, and roll directions may be calculated by using the position functions on the x, y, and z axes. In other words, an equation in rectangular coordinates may be changed to an equation in spherical coordinates to estimate a rotation motion of the photographing apparatus 100.

In the above descriptions, position and rotation motions of the photographing apparatus 100 are uniformly accelerated motions. However, the position and rotation motions of the photographing apparatus may be estimated on the assumption that the photographing apparatus 100 moves at an acceleration.

FIGS. 5A through 7C are views illustrating experimental results of the photographing apparatus 100 according to an exemplary embodiment.

Referring to FIG. 5A, three images which are obtained by continuously capturing a particular pattern are shown. As shown in FIG. 5A, since the photographing apparatus 100 moves at a constant velocity to the left side, the pattern is inclined to the right side as it moves down.

FIG. 5B illustrates a result of a compensated image according to the prior art, and FIG. 5C illustrates a result of a compensated image according to an exemplary embodiment of the present inventive concept. If the results of the compensated images of FIGS. 5B and 5C are compared with each other, a motion of a conventional photographing apparatus is compensated on the assumption that the conventional photographing apparatus moves at a constant velocity. Therefore, a distortion of a lower part of the pattern is not properly compensated for. However, a motion of a photographing apparatus according to the present inventive concept is compensated on the assumption that the photographing apparatus moves at a constant velocity. Therefore, compensation is provided for a distortion of a lower part of the pattern at which a velocity of the photographing apparatus is most greatly changed.

Figure 6:
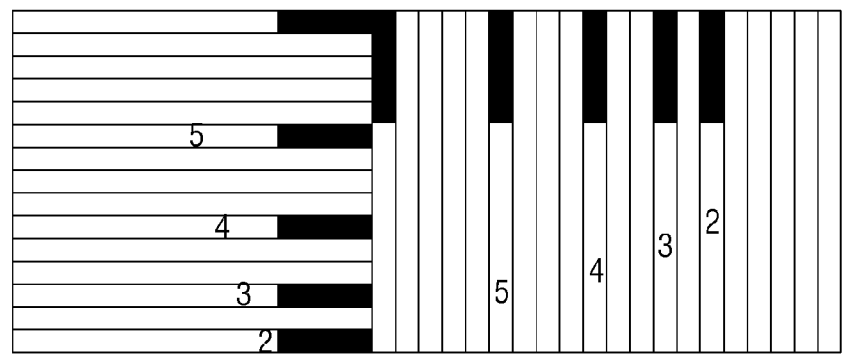

FIG. 6 is a view illustrating a photographing result of a photographing apparatus in a vibration environment. Here, the vibration environment refers to an environment in which the photographing apparatus vibrates at a vibration period of 6 Hz.

As is illustrated in FIG. 6, an image text is not included, and thus, it is difficult to estimate how each pixel line moves. However, as described above, a motion estimating method according to the present exemplary embodiment is to estimate a uniformly accelerated motion of the photographing apparatus based on a displacement (i.e., a global motion vector) of an image. Therefore, a rolling shutter effect may be efficiently compensated for even in this environment.

Figure 7A:
Figure 7B:
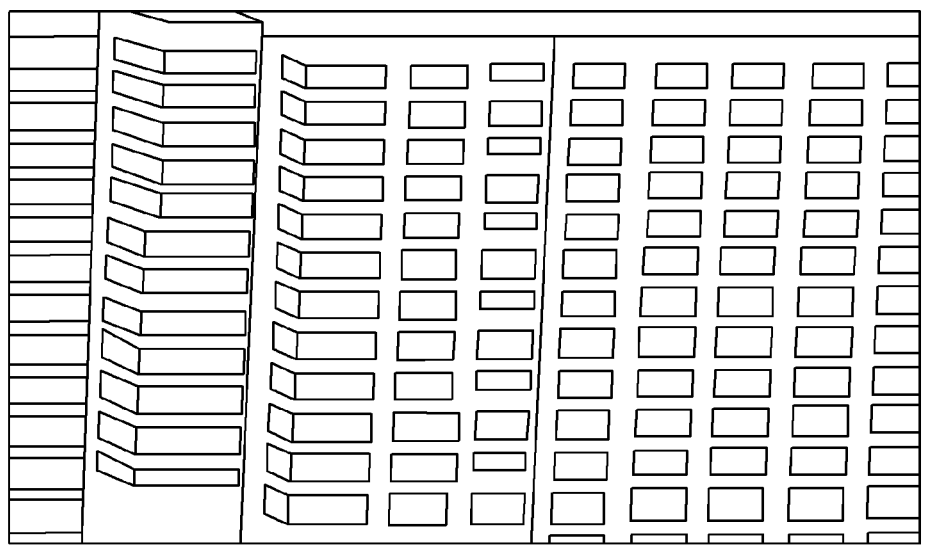
Figure 7C:

FIGS. 7A through 7C are views illustrating results of a subject captured by using a photographing apparatus according to the present inventive concept. In detail, FIG. 7A illustrates an original image which is obtained by capturing a subject without an additional compensation. FIG. 7B illustrates a captured image which is compensated for by using an OIS technique, and FIG. 7C illustrates a captured image which is compensated by using a compensating method according to the present inventive concept.

Referring to FIGS. 7A and 7B, if a motion of a photographing apparatus exceeds a displacement provided by the OIS technique, there may not be proper compensation for a rolling shutter phenomenon. However, referring to FIG. 7C, although the photographing apparatus is excessively displaced, the compensating method of the present inventive concept may effectively compensate for the rolling shutter phenomenon.

FIGS. 8A through 8D are views illustrating an effect of a photographing apparatus according to an exemplary embodiment.

Referring to FIG. 8A, if the photographing apparatus moves to the right side due to hand-shaking when a linear subject is captured, the photographing apparatus captures an image as illustrated in FIG. 8B due to a rolling shutter effect. Hand-shaking of a person is not a uniform motion, but a uniformly accelerated motion, and thus, a motion of a lower end part of a captured image is largest.

FIG. 8C illustrates a result of compensating the image of FIG. 8B by using a conventional compensating method (i.e., if it is assumed that a motion of a photographing apparatus is a uniform motion). FIG. 8D illustrates a result of compensating for the image of FIG. 8B by using a compensating method according to the present inventive concept (i.e., if it is assumed that a motion of the photographing apparatus is a uniformly accelerated motion). According to the conventional compensating method, the motion of the photographing apparatus is compensated for by using the assumption that the motion of the photographing apparatus is the uniform motion. Therefore, the compensation is inaccurate for the lower end part of the image which is greatly displaced, as is illustrated in FIG. 8C. However, according to the compensating method of the present inventive concept, an image is compensated for by using the assumption that the motion of the photographing apparatus is the uniformly accelerated motion. Therefore, the compensation is accurate for the lower end part of the image which is greatly displaced.

In the present exemplary embodiment, there is compensation for only a uniformly accelerated motion. However, if an acceleration constant is calculated as 0, the photographing apparatus estimates a motion thereof as a uniform motion. Therefore, according to the compensating method of the present inventive concept, not only a uniformly accelerated motion, but also a uniform motion, may be easily corrected.

Figure 10:
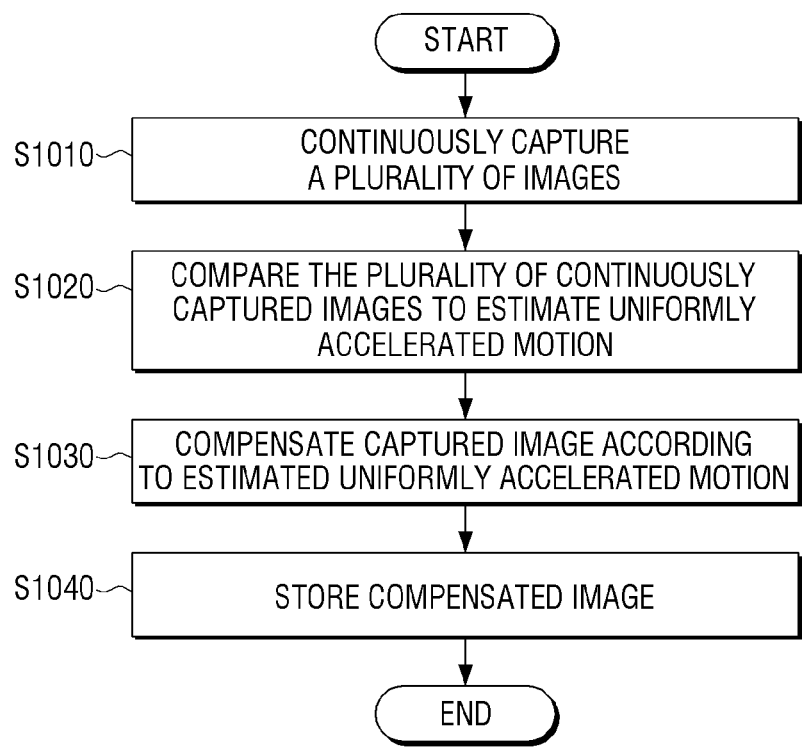
FIG. 10 is a flowchart illustrating an image compensating method according to an exemplary embodiment of the present general inventive concept.

FIG. 10 is a flowchart illustrating an image compensating method according to an exemplary embodiment.

Referring to FIG. 10, in operation S1010, a plurality of images are continuously captured. In detail, the plurality of images are continuously captured by using a rolling shutter method.

A uniformly accelerated motion of a photographing apparatus is compensated for by the using the plurality of images. In detail, in operation S1020, the uniformly accelerated motion of the photographing apparatus is estimated by using the plurality of images. In operation S1030, the plurality of images are compensated for based on the estimated uniformly accelerated motion. The detailed operation of estimating the uniformly accelerated motion has been described with reference to FIGS. 2 and 3, and thus repeated descriptions will be omitted. Also, the method of providing compensation to the image has been described in detail with reference to FIG. 1, and thus repeated descriptions will be omitted.

In operation S1040, the compensated image is stored.

As described above, according to the image compensating method of the present exemplary embodiment, a uniformly accelerated motion of the photographing apparatus 100 may be estimated by using continuously captured images. Also, a captured image may be compensated according to the estimated uniformly accelerated motion, and thus compensation for an image distortion caused by a rolling shutter phenomenon may be provided. In addition, since the uniformly accelerated motion of the photographing apparatus 100 is estimated, a motion of the photographing apparatus 100 may be further accurately estimated. The image compensating method illustrated in FIG. 10 may be performed by a photographing apparatus having a structure as illustrated in FIG. 1 or other photographing apparatuses having other types of structures.

Figure 11:
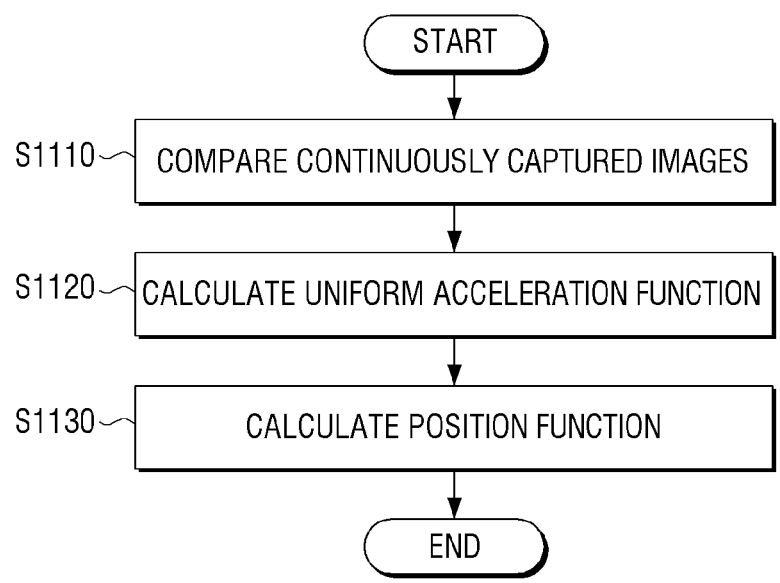
FIG. 11 is a flowchart illustrating a method of calculating a motion according to an exemplary embodiment of the present general inventive concept.

FIG. 11 is a flowchart illustrating a motion estimating method according to an exemplary embodiment.

Referring to FIG. 11, in operation S1110, images from a plurality of input images are compared with one another to check displacements among the plurality of input images. In detail, pixel lines of each of a plurality of images which are continuously captured may be compared with one another to check a position of a pixel line in another image based on a pixel line of one of the plurality of images in order to check a displacement of the pixel line.

In operation S1120, a uniform acceleration function of a motion velocity of a photographing apparatus is calculated according to the checked displacements. In detail, the uniform acceleration function of the motion velocity of the photographing apparatus may be calculated based on a displacement of a pixel line checked in a previous step.

In operation S1130, a position function of a position change of the photographing apparatus is calculated based on the calculated uniform acceleration function. In detail, a uniform acceleration function calculated in a previous step may be integrated to calculate a position function that is a quadratic function.

As described above, according to the motion estimating method of the present exemplary embodiment, a uniformly accelerated motion of the photographing apparatus 100 may be estimated by using continuously captured images. Therefore, a motion of the photographing apparatus 100 may be further accurately estimated. The motion estimating method of FIG. 11 may be performed by a motion estimating apparatus having a structure as described with reference to FIG. 2, or other motion estimating apparatuses having other types of structures.

The above-described motion estimating method may be realized as at least one execution program for executing the motion estimating method, and the execution program may be stored on a computer-readable recording medium.

Therefore, blocks of the present inventive concept may be executed as computer-recordable codes on the computer-readable recording medium. The computer-readable recording medium may be a device which can storage data read by a computer system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus comprising:
an image sensor configured to receive a plurality of images by using a rolling shutter method;
a motion estimator configured to compare at least one pixel line in each of the plurality of images, corresponding to one another in the plurality of images, to determine displacements of the at least one pixel line in the plurality of images, and estimate an accelerated motion of the photographing apparatus based on the determined displacements of the at least one pixel line in the plurality of images; and
an image processor configured to generate an image by compensating for the accelerated motion of the photographing apparatus estimated by the motion estimator.

2. The photographing apparatus as claimed in claim 1, wherein the motion estimator compares a plurality of pixel lines in each of the plurality of images, corresponding to one another in the plurality of images, to determine displacements of each of the plurality of pixel lines in the plurality of images to calculate a plurality of uniform accelerated functions for the accelerated motion of the photographing apparatus based on the displacements of each of the plurality of pixel lines in the plurality of images.

3. The photographing apparatus as claimed in claim 1, wherein the motion estimator comprises:
a comparator configured to compare the at least one pixel line in each of the plurality of images to determine the displacements of the at least one pixel line;
a velocity calculator configured to calculate a uniform acceleration function of a motion velocity of the photographing apparatus to estimate the accelerated motion, according to the determined displacements of the at least one line; and
a position calculator configured to calculate a position function of a position change of the photographing apparatus by using the calculated uniform acceleration function.

4. The photographing apparatus as claimed in claim 1, wherein the comparator is configured to compare the at least one pixel line in each of the plurality of images in a direction selected from x, y, z, yaw, pitch and roll directions to determine displacements of the at least one pixel line.

5. The photographing apparatus as claimed in claim 1, wherein the motion estimator compares a preset pixel group in each of the at least one pixel line in each of the plurality of images, the preset pixel group corresponding to one another in the plurality of images, to determine displacements of the preset pixel group in the plurality of images, and estimate the accelerated motion of the photographing apparatus based on the determined displacements of the preset pixel group.

6. The photographing apparatus as claimed in claim 1, wherein the motion estimator compares a plurality of pixel lines in each of the plurality of images, corresponding to one another in the plurality of images, to determine displacements of each of the plurality of pixel lines in the plurality of images, and averages displacements of the plurality of pixel lines in each of the plurality of images in the plurality of images to calculate a uniform accelerated function for the accelerated motion of the photographing apparatus based on the averaged displacements of each of the plurality of pixel lines in the plurality of images.

7. A photographing apparatus comprising:
an image sensor configured to receive a plurality of images by using a rolling shutter method;
a motion estimator configured to estimate an accelerated motion of the photographing apparatus by using the plurality of images; and an image processor configured to generate an image by compensating for the estimated accelerated motion of the photographing apparatus, wherein the motion estimator comprises:
a comparator configured to compare the plurality of images with one another to determine displacements among the plurality of images;
a velocity calculator configured to calculate a uniform acceleration function of a motion velocity of the photographing apparatus according to the checked displacements; and
a position calculator configured to calculate a position function of a position change of the photographing apparatus by using the calculated uniform acceleration function, and,
wherein the uniform acceleration function is a linear function of time as in an Equation below:

$$v_n(t) = v_{n,0} + a(t-n) \quad n \leq t < n+1,$$

where t denotes time, n denotes a number of the plurality of images, Vn(t) denotes a velocity of the photographing apparatus at the time t, $v_{n,0}$ denotes an initial velocity of the photographing apparatus at an $n^{th}$ image among the plurality of images, and a denotes an acceleration constant.

8. The photographing apparatus as claimed in claim 7, wherein the initial velocity $v_{n,0}$ of the photographing apparatus is calculated by using an Equation below:

$$v_{n,0} = GMV(n-1) - \tfrac{1}{6}(GMV(n) - 2GMV(n-1) + GMV(n-2)),$$

where $v_{n,0}$ denotes the initial velocity of the photographing apparatus at the $n^{th}$ image, and GMV denotes a displacement of an image among the plurality of images.

9. A photographing apparatus comprising:
an image sensor configured to receive a plurality of images by using a rolling shutter method;
a motion estimator configured to estimate an accelerated motion of the photographing apparatus by using the plurality of images; and
an image processor configured to generate an image by compensating for the estimated accelerated motion of the photographing apparatus,
wherein the motion estimator comprises:
a comparator configured to compare the plurality of images with one another to determine displacements among the plurality of images;
a velocity calculator configured to calculate a uniform acceleration function of a motion velocity of the photographing apparatus according to the checked displacements; and
a position calculator configured to calculate a position function of a position change of the photographing apparatus by using the calculated uniform acceleration function, and
wherein the position calculator integrates the calculated uniform acceleration function to calculate the position function of the position change of the photographing apparatus, and
wherein the position function is a quadratic function of time.

10. The photographing apparatus as claimed in claim 1, wherein the motion estimator estimates an accelerated motion of the image sensor in one axis direction and an accelerated motion of the image sensor in a direction perpendicular to the one axis direction, based on the displacements of the at least one pixel line in the plurality of images.

11. The photographing apparatus as claimed in claim 1, wherein the motion estimator estimates at least one of an accelerated motion in a yaw direction based on a center of the image sensor, an accelerated motion in a pitch direction based on the center of the image sensor, and an accelerated motion in a roll direction based on the center of the image sensor, to estimate the accelerated motion of the photographing apparatus.

12. A method of generating an image in a photographing apparatus, the method comprising:
capturing a plurality of images by using a rolling shutter method; and
comparing at least one pixel line in each of the plurality of images, corresponding to one another in the plurality of images, to determine displacements of the at least one pixel line in the plurality of images, and estimating an accelerated motion of the photographing apparatus based on the determined displacements of the at least one pixel line; and
generating an image by compensating for the estimated accelerated motion of the photographing apparatus.

13. The method as claimed in claim 12, wherein the comparing comprises comparing a plurality of pixel lines in each of the plurality of images, corresponding to one another in the plurality of images, to determine displacements of each of the plurality of pixel lines in the plurality of images to calculate a plurality of uniform accelerated functions for the accelerated motion of the photographing apparatus based on the displacements of each of the plurality of pixel lines in the plurality of images.

14. The method as claimed in claim 12, wherein the comparing comprises:
comparing the at least one pixel line in each of the plurality of images to determine the displacements of the at least one pixel line;
calculating a uniform acceleration function of a motion velocity of the photographing apparatus to estimate the accelerated motion, according to the determined displacements on the at least one pixel line; and
calculating a position function of a position change of the photographing apparatus by using the calculated uniform acceleration function.

15. The method as claimed in claim 12, wherein the comparing comprises comparing the at least one pixel line in each of the plurality of images in a direction selected from x, y, z, yaw, pitch and roll directions to determine displacements of the at least one pixel line.

16. The method as claimed in claim 12, wherein the comparing comprises comparing a preset pixel group in each of the at least one pixel line in each of the plurality of images, the preset pixel group corresponding to one another in the plurality of images, to determine displacements of the preset pixel group in the plurality of images, and estimating the accelerated motion of the photographing apparatus based on the determined displacements of the preset pixel group.

17. The method as claimed in claim 12, wherein the comparing comprises comparing a plurality of pixel lines in each of the plurality of images, corresponding to one another in the plurality of images, to determine displacements of each of the plurality of pixel lines in the plurality of images, and averaging displacements of the plurality of pixel lines in each of the plurality of images to calculate a uniform accelerated function for the accelerated motion of the photographing apparatus based on the averaged displacements of each of the plurality of pixel lines in the plurality of images.

18. A method of generating an image in a photographing apparatus, the method comprising:
   receiving a plurality of images by using a rolling shutter method;
   estimating an accelerated motion of the photographing apparatus by using the plurality of images; and
   generating an image by compensating for the estimated accelerated motion of the photographing apparatus,
   wherein the estimating comprises:
   comparing the plurality of images with one another to determine displacements among the plurality of images;
   calculating a uniform acceleration function of a motion velocity of the photographing apparatus according to the checked displacements; and
   calculating a position function of a position change of the photographing apparatus by using the calculated uniform acceleration function, and,
   wherein the uniform acceleration function is a linear function of time as in an Equation below:

$$v_n(t) = v_{n,0} + a(t-n) \quad n \leq t < n+1,$$

where t denotes time, n denotes a number of the plurality of images, Vn(t) denotes a velocity of the photographing apparatus at the time t, $v_{n,0}$ denotes an initial velocity of the photographing apparatus at an $n^{th}$ image among the plurality of images, and a denotes an acceleration constant.

19. The method as claimed in claim 18, wherein the initial velocity $v_{n,0}$ of the photographing apparatus is calculated by using an Equation below:

$$v_{n,0} = GMV(n-1) - \frac{1}{6}(GMV(n) - 2GMV(n-1) + GMV(n-2)),$$

where $v_{n,0}$ denotes the initial velocity of the photographing apparatus at the $n^{th}$ image, and GMV denotes a displacement of an image among the plurality of images.

20. The method as claimed in claim 12, wherein the accelerated motion of the photographing apparatus comprises a first uniform acceleration function calculated in one axis direction and a second uniform acceleration function calculated in a direction perpendicular to the one axis direction.

21. The method as claimed in claim 12, wherein the accelerated motion of the photographing apparatus comprises at least one of a uniform acceleration function calculated in a yaw direction, a uniform acceleration function calculated in a pitch direction, and a uniform acceleration function calculated in a roll direction.

22. A method of generating an image in a photographing apparatus, the method comprising:
   receiving a plurality of images by using a rolling shutter method;
   estimating an accelerated motion of the photographing apparatus by using the plurality of images; and
   generating an image by compensating for the estimated accelerated motion of the photographing apparatus,
   wherein the estimating comprises:
   comparing the plurality of images with one another to determine displacements among the plurality of images;
   calculating a uniform acceleration function of a motion velocity of the photographing apparatus according to the checked displacements; and
   calculating a position function of a position change of the photographing apparatus by using the calculated uniform acceleration function,
   wherein the calculated uniform acceleration function is integrated to calculate the position function of the position change of the photographing apparatus, and
   wherein the position function is a quadratic function of time.

23. A non-transitory computer-readable recording medium comprising a program for executing a method of generating an image, the method comprising:
   capturing a plurality of images by using a rolling shutter method; and
   comparing at least one pixel line in each of the plurality of images, corresponding to one another in the plurality of images, to determine displacements of the at least one pixel line in the plurality of images, and estimating an accelerated motion of the photographing apparatus based on the determined displacements of the at least one pixel line; and
   generating an image by compensating for the estimated accelerated motion of the photographing apparatus.

* * * * *